(12) United States Patent
Morisaki

(10) Patent No.: US 7,327,483 B2
(45) Date of Patent: Feb. 5, 2008

(54) DOCUMENT READING DEVICE

(75) Inventor: Hiroshi Morisaki, Aichi-ken (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1018 days.

(21) Appl. No.: 10/395,114

(22) Filed: Mar. 25, 2003

(65) Prior Publication Data
US 2003/0184828 A1  Oct. 2, 2003

(30) Foreign Application Priority Data
Mar. 29, 2002  (JP) ............................. 2002-097277

(51) Int. Cl.
H04N 1/46  (2006.01)
(52) U.S. Cl. .................. 358/1.15; 358/444; 358/404; 358/1.16; 358/468
(58) Field of Classification Search ............... 358/1.16, 358/402, 404, 442, 444, 468
See application file for complete search history.

(56) References Cited

U.S. PATENT DOCUMENTS

| 5,041,873 | A | * | 8/1991 | Kawabuchi et al. ......... 399/83 |
| 5,196,947 | A | * | 3/1993 | Takahashi ................... 358/441 |
| 5,675,422 | A | * | 10/1997 | Hara et al. .................. 358/404 |
| 5,999,708 | A | | 12/1999 | Kajita |
| 6,069,706 | A | | 5/2000 | Kajita et al. |
| 6,239,837 | B1 | * | 5/2001 | Yamada et al. .......... 348/231.5 |
| 6,433,883 | B1 | | 8/2002 | Kajita |
| 6,515,697 | B1 | * | 2/2003 | Yamada et al. .......... 348/231.6 |
| 2002/0041330 | A1 | * | 4/2002 | Uryu et al. ................. 348/233 |
| 2005/0055482 | A1 | * | 3/2005 | Aizawa ....................... 710/62 |

FOREIGN PATENT DOCUMENTS

| JP | A 9-102840 | 4/1997 |
| JP | B2 3156366 | 2/2001 |

* cited by examiner

Primary Examiner—Kimberly A. Williams
(74) Attorney, Agent, or Firm—Oliff & Berridge, PLC

(57) ABSTRACT

A document reading device is provided with a reading unit for reading a document and generating image data corresponding to an image formed on the document. The image data is stored in an external memory that is detachably attached to a slot of the device. The operation for storing the image data to the external memory is interrupted if the external memory is removed from the slot after the document reading is started. Thereafter, when the external memory is reattached to the document reading device, the image storing operation is restarted.

21 Claims, 9 Drawing Sheets

DOCUMENT READING DEVICE

BACKGROUND OF THE INVENTION

The present invention relates to a document reading device which creates image data by reading an image formed on a document, and more particularly, a document reading device capable of storing the thus created image data in an external memory that is detachably attached to the document reading device.

Some printers on the market today are equipped with a slot to which a record medium or external memory (e.g., Compact Flash (registered trademark of SanDisk Corporation). Smart Media (registered trademark of Toshiba Corporation)) storing image data (shot by a digital camera, generated by a personal computer, etc.) can be attached. Such a printer having a memory slot is generally capable of reading the image data from the record medium attached to the slot and printing out the image data on paper etc. There also exist printers called "multifunctional printers", in which a printer having such a memory slot is combined with a document reading device having a document reading (scanning) function. In such multifunctional printers, the user can attach/detach the record medium (external memory) from the slot freely.

Since the record medium can be removed from the slot at any time in such a multifunctional printer, there are cases where the user removes the record medium from the slot while image data is being read out from the record medium (for example, when the user does not know how to stop printing or got upset by noticing his/her misoperation after instructing the printer to read out image data from the record medium and print it out). Even in such a case, the image data stored in the record medium is rarely destroyed and no trouble occurs in most cases if the printer is executing simple data readout operation when the record medium is removed from the slot.

However, if the multifunctional printer to have an image data storing function (i.e., a function of storing image data in the record medium attached thereto), serious problems are expected to occur, that is, problems that are caused by the user's removal of the record medium from the slot while the multifunctional printer is writing some data to the record medium. In such cases, the record medium is detached from the slot in the midst of the rewriting or updating of the contents of the record medium, by which, in addition to the impossibility of continuing the image data storing as a natural consequence, the record medium itself might be destroyed (i.e., it becomes impossible to read/write data from/in the record medium anymore) at worst. As an example of the above image data storing function, some multifunctional printers have a function for storing image data in the record medium after reading a document by its document reading device such as a scanner. If the record medium is erroneously removed from the slot while the multifunctional printer is writing the image data to the record medium, the image data storing to the record medium can not be continued anymore. As a result, an error occurs to the multifunctional printer and the image data which has been read by the document reading device to some midpoint becomes unusable. Therefore, the document reading operation by the document reading device has to be conducted again from the beginning in order to store the image data of the document in the record medium. The rereading of the document has to be done from the first page of the document, taking a long time especially when the amount of the document is large, by which the usability of the multifunctional printer (document reading device) is deteriorated.

SUMMARY OF THE INVENTION

The present invention has been made in consideration of the above problems. The present invention is advantageous in that a document reading device and a document reading method, capable of storing data of the document in a record medium without wasting data that has been read so far even if the record medium is erroneously detached from the slot during data writing, can be provided.

In accordance with a first aspect of the present invention, there is provided a document reading device includes: a reading system which reads a document and generates image data corresponding to the document; an attachment system to which an external memory is attached detachably; a memory detection system which detects whether or not the external memory is attached to the attachment system; a storing system which stores the image data generated by the reading system in the external memory; and a control system which controls the operation of the reading system and the storing system based on information that is supplied from the memory detection system. The control system interrupts the image data storing to the external memory by the storing system if the memory detection system detected removal of the external memory from the attachment system after the reading system started the document reading, and the control system controls the storing system to carry out a predetermined operation based on information stored in the external memory if the memory detection system detected reattachment of the external memory to the attachment system.

By the document reading device, even if the detachable external memory is erroneously removed from the slot while the image data of the document read by the reading system is being stored in the external memory, the image data storing operation to the external memory can be interrupted normally according to a signal supplied from the memory detection system, by which the occurrence of errors can be avoided. When the external memory is reattached to the slot after the removal, a predetermined operation, (e.g., the image data storing operation) can be restarted based on the internal information of the reattached external memory.

Optionally, the control system may control the reading system to interrupt the document reading and the image data generation when the image data storing by the storing system is interrupted.

Preferably, the control system may include a judgment system which judges whether or not the external memory reattached to the attachment system is the same as the external memory that was removed from the attachment system at the point when the storing system interrupted the image data storing.

Optionally, if the judgment system judges that the reattached external memory is the same as the external memory that was removed from the attachment system at the point when the storing system interrupted the image data storing, the control system controls the storing system to restart the image data storing and store the remainder of the image data in the reattached external memory starting at the endpoint of the image data that had already been stored in the external memory at the point when the image data storing was interrupted.

Further optionally, the document reading device may further include: an inquiry system which inquires of the user whether or not to restart the image data storing; and an input system which lets the user input an instruction on whether or not to restart the image data storing.

Still optionally. the document reading device may further comprise an internal memory In addition to the external memory. The control system lets the internal memory temporarily store the image data generated by the reading system and controls the storing system to carry out the image data storing to the external memory by transferring the image data from the internal memory to the external memory.

By the above document reading device, the image data generated by the reading system is securely stored in the internal memory without being lost even if the external memory is removed from the attachment system. Even when the external memory is removed from the attachment system during the image data transfer from the internal memory to the external memory, it is possible to store the whole image data of the document in the external memory without repeating the document reading, using the image data temporarily stored in the internal memory.

In a certain case, the control system may let the internal memory store the whole image data of the document and thereafter controls the storing system to transfer the image data from the internal memory to the external memory.

In an alternative case, the control system may let the internal memory successively store the image data of the document while controlling the storing system to successively transfer the image data from the internal memory to the external memory.

Optionally, the control system may include a judgment system which judges whether or not the external memory reattached to the attachment system is the same as the external memory that was removed from the attachment system at the point when the storing system interrupted the Image data storing.

Further optionally, the document reading device may further include: an inquiry system which inquires of the user whether or not to restart the image data storing; and an input system which lets the user input an instruction on whether or not to restart the image data storing.

Furthermore, the document reading device may further comprise an informing system which provides information to the user based on the judgment by the judgment system. When the judgment system judged that the reattached external memory is different from the external memory that was removed from the attachment system at the point when the storing system interrupted the image data storing, the control system controls the informing system to inform the user of the reattachment of the different external memory or the occurrence of a corresponding error.

By the informing system, the user can notice the incorrect reattachment easily and certainly, and reattach the original external memory immediately. As the informing system, an LCD panel for displaying messages, a speaker for outputting sound or voice, a combination of them, etc. can be employed.

Optionally, the reading system may restart the document reading and the image data storing to the external memory if the memory detection system detects reattachment of the external memory to said attachment system.

In accordance with a further aspect of the present invention, there is provided a document reading method for reading a document and storing image data corresponding to an image formed on the document in an external memory that is detachably attached to a document reading device. The method includes the steps of: reading a document and generating image data corresponding to the image; storing the image data generated by the reading system in the external memory; detecting whether or not the external memory is attached to the slot; interrupting the steps of reading and storing if removal of the external memory from the slot is detected after the document reading is started, and restarting the document reading if the external memory is reattached to the document reading device.

In accordance with a further aspect of the present invention, there is provided a computer-readable record medium storing a program for the execution of the document reading method of the second aspect of the present invention. The program stored in the record medium is read out and executed by a computer, a microprocessor unit (composed of a CPU, ROM, RAM, ASIC, etc. etc., by which the document reading method is carried out.

BRIEF DESCRIPTION OF THE ACCOMPANYING DRAWINGS

Figure 6:
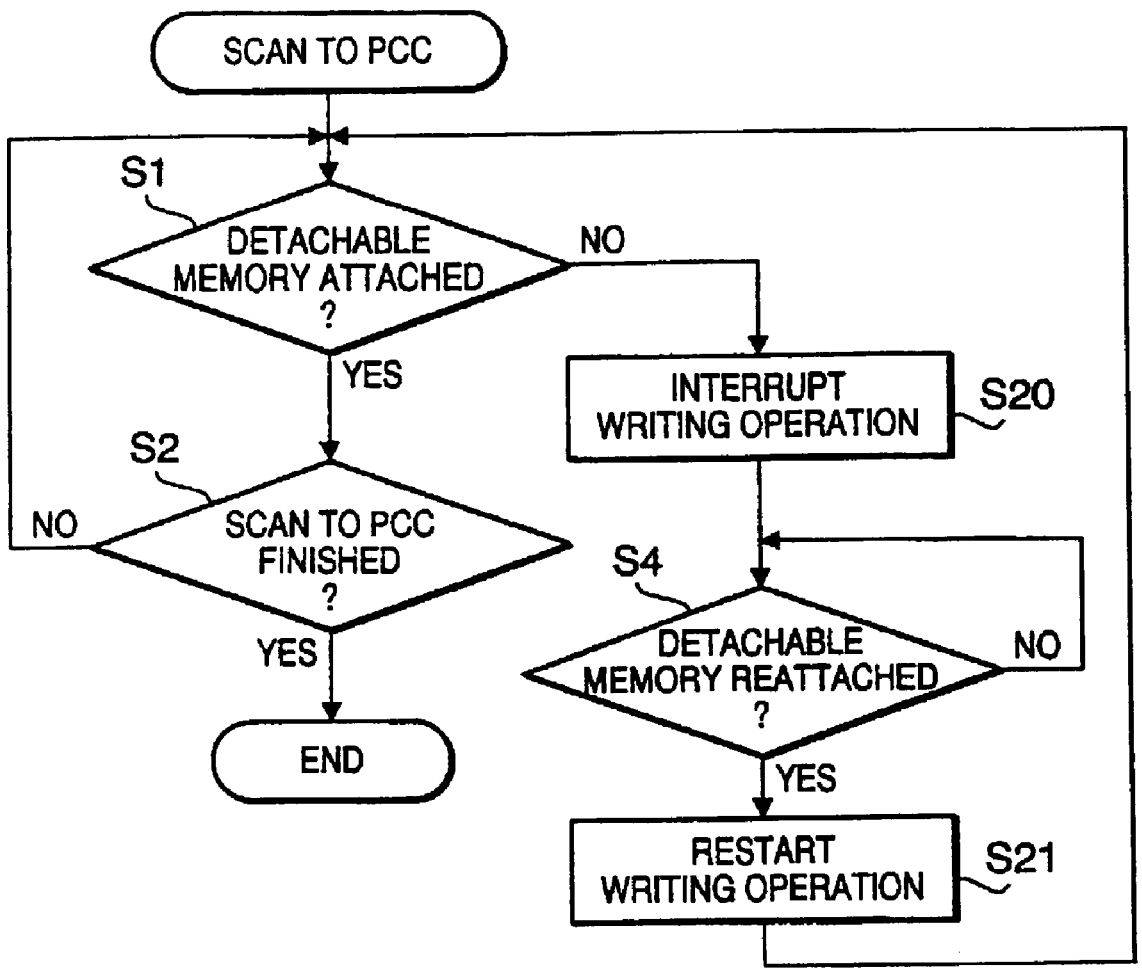
Figure 7:
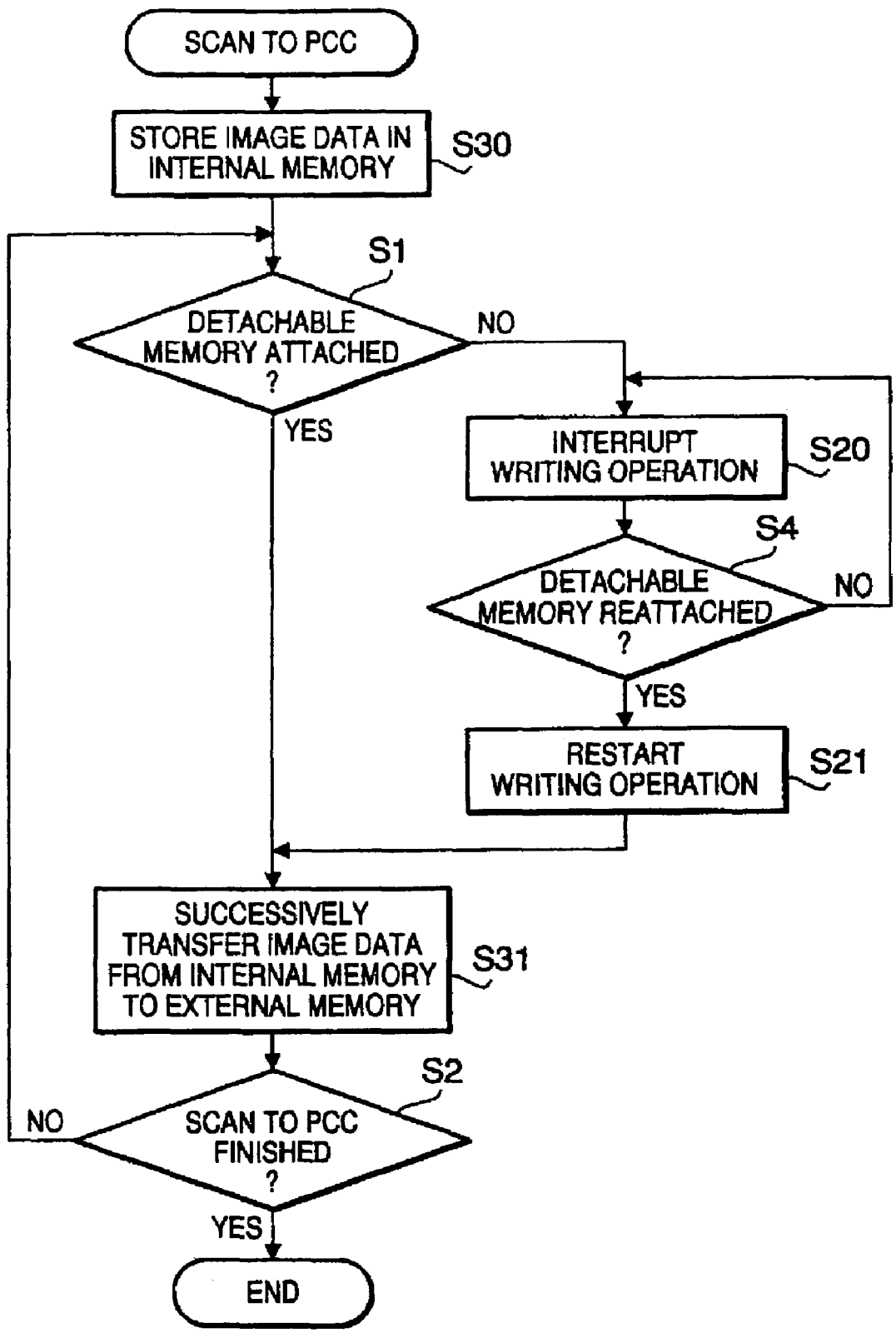
Figure 8:
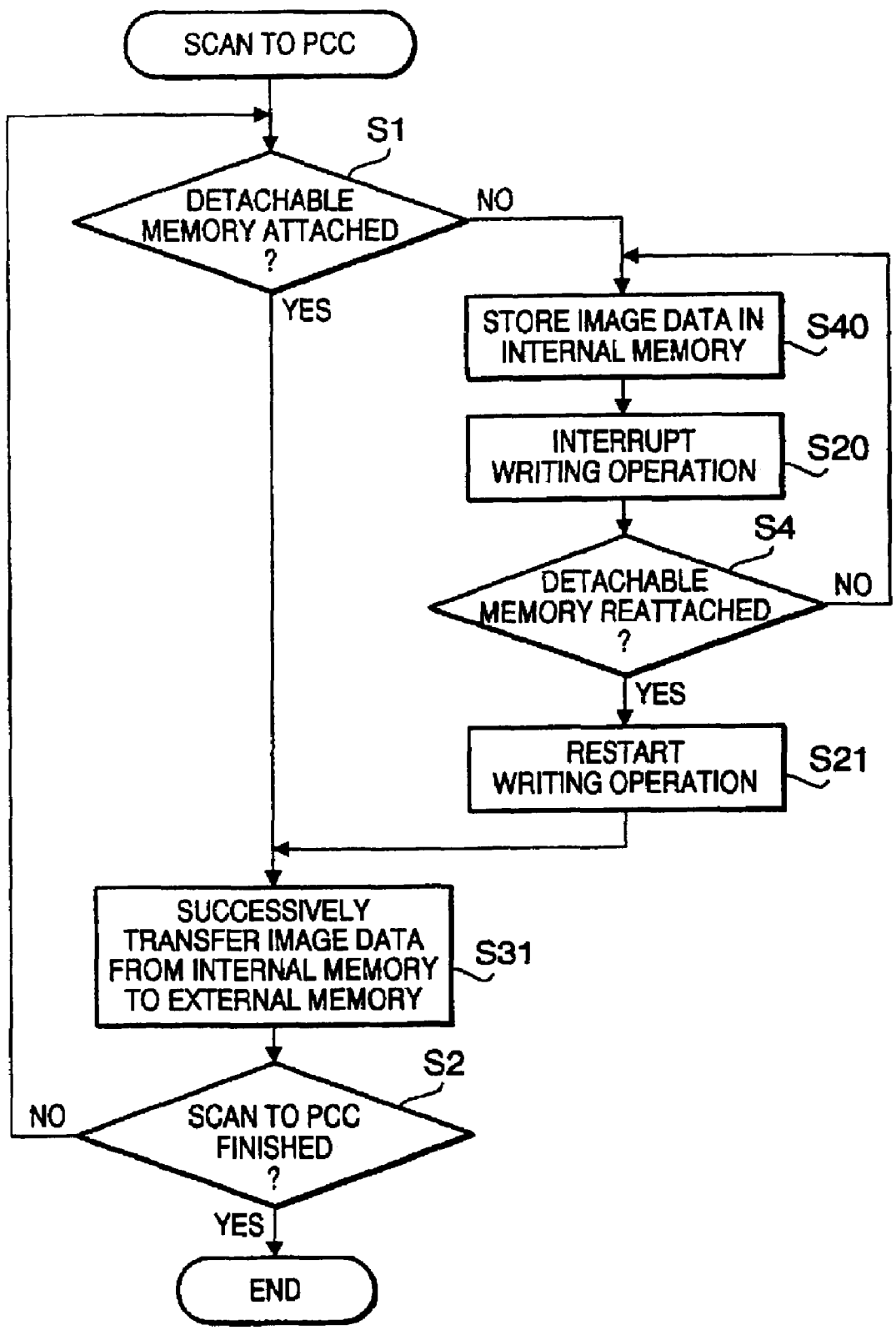
Figure 9:
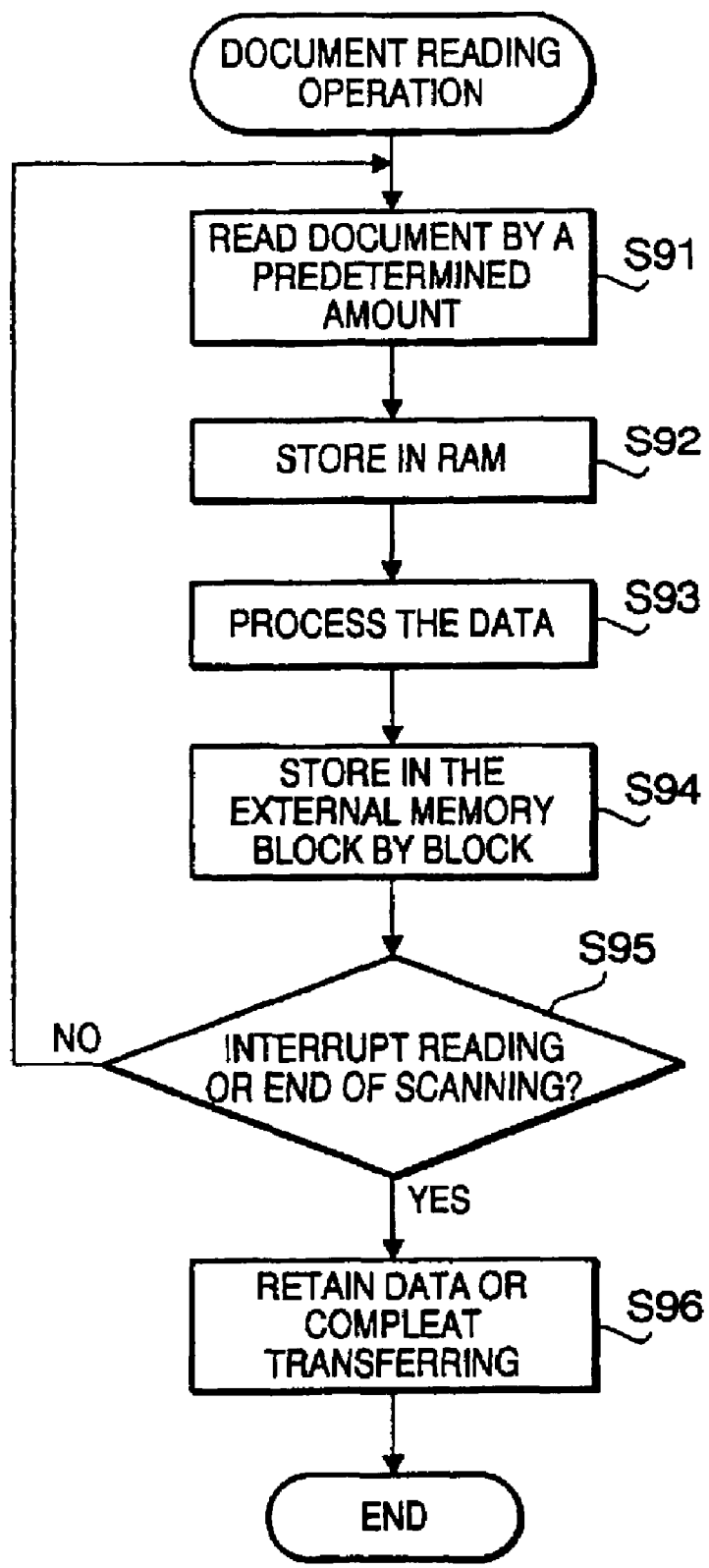

FIG. 6 is a flowchart showing another example of the framework of the operation of the multifunctional peripheral device, in which the device is controlled to interrupt image data storing to the external memory if the external memory is removed from a slot during the image data storing; FIG. 7 is a flowchart showing a concrete example of the operation of the multifunctional peripheral device according to the framework of FIG. 6;

FIG. 8 is a flowchart showing another concrete example of the operation of the multifunctional peripheral device according to the framework of FIG. 6; and FIG. 9 is a flowchart showing the document reading operation.

DESCRIPTION OF THE EMBODIMENTS

Referring now to the drawings, a description will be given in detail of embodiments in accordance with the present invention.

Figure 1:
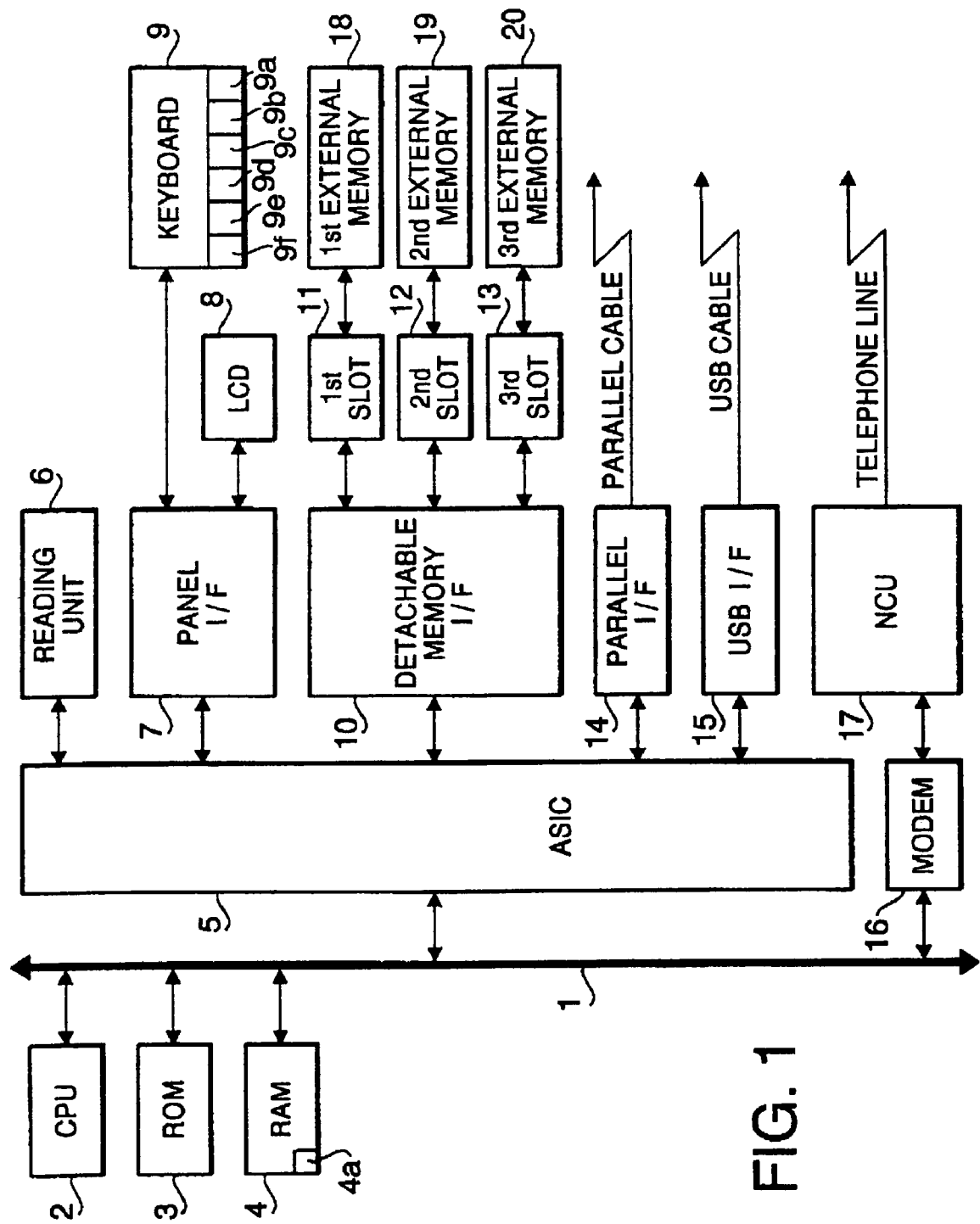
FIG. 1 is a block diagram showing a configuration of a multifunctional peripheral device as a document reading device in accordance with an embodiment of the present invention.

FIG. 1 is a block diagram showing a configuration of a document reading device in accordance with an embodiment of the present invention. Concretely, the document reading device of FIG. 1 is a multifunctional peripheral device (MFP) having a communication function (for communicating image data, audio data and the like with facsimile machines, telephone sets and the like at distant places via a public network circuit). The multifunctional peripheral device can also be connected to a PC (Personal Computer) so as to function as the printer, scanner and the like. The multifunctional peripheral device can also be used singly as a multifunctional device having a document copying function and an image data storing function (reading a document, generating image data of the document, and storing the image data in an external memory which will be explained later). The multifunctional peripheral device may also be provided with an image data transmission function for transmitting the image data stored in the external memory to other facsimile machines and the like. The printing function of the document reading device (multifunctional peripheral device) is not particularly relevant to the present invention, therefore, blocks of the device relating to the printing function are omitted in the block diagram of FIG. 1.

The multifunctional peripheral device shown in FIG. 1 is provided with an ASIC (Application-Specific Integrated Circuit) 5, a CPU (Central Processing Unit) 2, a ROM (Read Only Memory) 3 storing various control programs regarding the operation of the multifunctional peripheral device, a RAM (Random Access Memory) 4 as a working area for temporarily storing programs and data when the programs stored in the ROM 3 are executed, and a modem 16 as a modulation/demodulation device to be used for communication with other communication devices, which are interconnected through a bus 1.

To the ASIC 5, a reading unit 6, a panel interface 7, a detachable memory interface 10 and the like are connected.

The reading unit 6, having an not-shown automatic document feeder and a transparent document support table, reads a document on the table with its image sensors such as a CCD (Charge-Coupled Device) image sensor, CISs (Contact Image Sensors) or a CMOS (Complementary Metal Oxide Semiconductor) image sensor.

To the panel interface 7, an LCD (Liquid Crystal Display) panel 8 and a keyboard 9 are connected. Information concerning the statuses of the multifunctional peripheral device, messages to the user and the like are displayed on the LCD panel 8. The keyboard 9 has various instruction keys and numeric keys (9b-9f) for allowing the user to input instructions, data and the like.

The keyboard 9 is also provided with a "Scan to PCC" key 9a for instructing the multifunctional peripheral device to execute a "Scan to PCC" process. The "Scan to PCC" process will be explained later.

Three slots are connected to the detachable memory interface 10, to each of which an external memory can be attached in a detachable manner. It should be noted that, in order to detect attachment of an external memory, each slot is provided with a memory sensor, which detects attachment of the external memory by variation of a voltage. Further, a parallel interface 14 and a USB (Universal Serial Bus) interface 15 (for the connection with the PC etc. using a parallel cable or USB cable) are also connected to the ASIC 5.

To the modem 16, an NCU (Network Control Unit) 17 is connected. The NCU 17 connects the multifunctional peripheral device to another communication device at a distant place via the public network circuit when the user inputted a telephone number or a fax number with use of the numeric keys of the keyboard 9, shortcut key and the like.

As mentioned above, the multifunctional peripheral device shown in FIG. 1 has three slots: a first slot 11. a second slot 12 and a third slot 13, and an external memory can be attached to each slot (11-13) detachably. A first external memory 18, second external memory 19 and third external memory 20 can be attached to the first slot 11, second slot 12 and third slot 13, respectively.

In this embodiment, the first through third external memories 18-20 are of different types. For example, the first through third external memories 18-20 can be a Memory Stick (registered trademark of Sony Corporation), a Compact Flash and a Smart Media, respectively. In other words, the first through third slots 11-13 can be special-purpose slots for Memory Stick, Compact Flash and Smart Media, respectively.

Incidentally, the types of the memories to be employed as the first through third external memories 18-20 are not limited to the above three types. For instance, other types of record media such as floppy disk (registered trademark), MO (Magnetic Optical Disk), CD-R (Compact Disc Recordable), CD-RW (Compact Disc Re-Writable), DVD-R (Digital Versatile Disc Recordable), DVD-RAM (Digital Versatile Disc Random Access Memory), DVD-RW (Digital Versatile Disc Re-Writable) and the like can also be employed alternatively or optionally. As a matter of course, the first through third slots 11-13 are implemented by drives supporting these record media when these record media are employed.

Although three different types of record media are employed as the first through third external memories 18-20 in this embodiment, it is also possible to employ two or more record media of the same type. For example, it is possible to employ three record media of the same type, or two record media of the same type and one record medium of a different type. In such cases, two or more slots of. the same type are provided to the multifunctional peripheral device.

While the LCD panel 8 is employed as an informing unit (for providing information to the user) in the multifunctional peripheral device of FIG. 1, other types of information units such as one informing by sound or voice, one informing by a combination of the LCD panel 8 and voice and the like can also be employed.

When the user starts the reading, the storing, the transmission or the deletion of the document image by operating the keyboard 9, a prescribed process is carried out according to a control program stored in the ROM 3, under the control of the CPU 2. The RAM 4 functions also as a buffer for temporarily storing the image data.

In the following description, the overall operation of the multifunctional peripheral device as a document reading device in accordance with the present invention will be explained briefly.

As mentioned above, the multifunctional peripheral device of FIG. 1 is capable of conducting an image data storing process that is called "Scan to PCC (Photo Capture Center)" process. In the "Scan to PCC" process, an image on a document read by the reading unit 6 is converted into image data of a prescribed format and the image data is stored in the first, second or third external memory (18-20), selectively.

In order to let the multifunctional peripheral device carry out the "Scan to PCC" process, the user first sets the multifunctional peripheral device to a "Scan to PCC" mode by pressing the aforementioned "Scan to PCC" key 9a of the keyboard 9. Subsequently, the user selects one of the first through third external memories 18-20 for storing the image data of the document read by the reading unit 6. Thereafter, the Scan to PCC process is carried out and thereby the image data of the document is stored in the selected external memory.

In the multifunctional peripheral device, image data that can be stored in the first through third external memories 18-20 is not limited to the image data of documents read by the reading unit 6 in the Scan to PCC process. Image data received from other communication devices via the NCU 17 and the modem 16, image data received from the PC connected to the multifunctional peripheral device, etc. can also be stored in the external memories 18-20.

In the following description, the "Scan to PCC" process carried out by the multifunctional peripheral device will be explained briefly referring to figures following FIG. 2.

Figure 2:
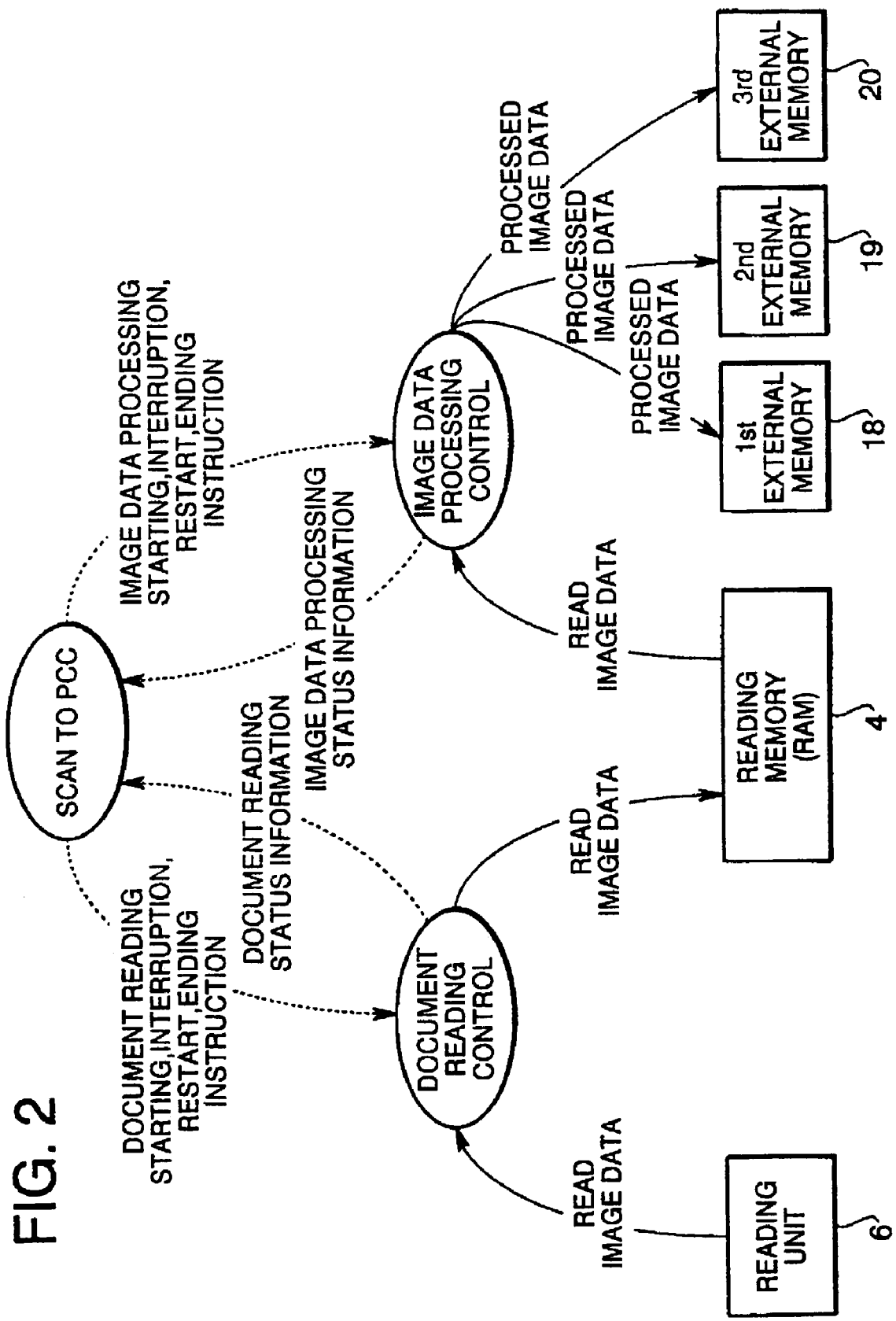
FIG. 2 is a schematic diagram showing the outline of "Scan to PCC" process which is carried out by the multifunctional peripheral device of FIG. 1.

FIG. 2 is a schematic diagram showing the outline of the "Scan to PCC" process. In the "Scan to PCC" process, the multifunctional peripheral device is controlled to carry out a document reading control step (in which the document is read by the reading unit 6) and an image data processing control step (in which the image data is compressed into JPEG (Joint Photographic Experts Group) data) in cooperation with each other. Ellipsoids in FIG. 2 denote processes that are carried out by software, and rectangles at the bottom of FIG. 2 denote hardware.

Instructions regarding the starting, interruption, restart and ending of the document reading are issued in the document reading control step, and uncompressed image data of the document read by the reading unit 6 is temporarily stored in the RAM 4 (reading memory). Meanwhile. In the image data processing control step, the uncompressed image data of the document is read out from the RAM 4 and the data is compressed and converted into JPEG data. In the image data processing control step, instructions concerning the starting, interruption, restart and ending of the image data processing are issued. The compressed image data (JPEG data) is stored in selected one of the first through third external memories 18-20 which are detachably attached to the slots 11-13 of the multifunctional peripheral device, respectively. By the above operation, the image on the document read by the reading unit 6 can be stored selectively in one of the first through third external memories 18-20. Incidentally, as in the above sentence, expressions "image data", "image data of the document" "image data read by the reading unit 6", "image data generated by the reading unit 6" which appear in the following description can widely mean the processed or compressed data (JPEG data etc.) obtained in the image data processing control step.

By virtue of the "Scan to PCC" function of the multifunctional peripheral device, even if the user removed the external memory from the slot in the midst of data writing to the external memory, the image data can successfully be stored in the external memory later by reattaching the removed external memory. In the following description, such processes will be explained referring to flowcharts shown in FIGS. 3 through 8.

Figure 3:
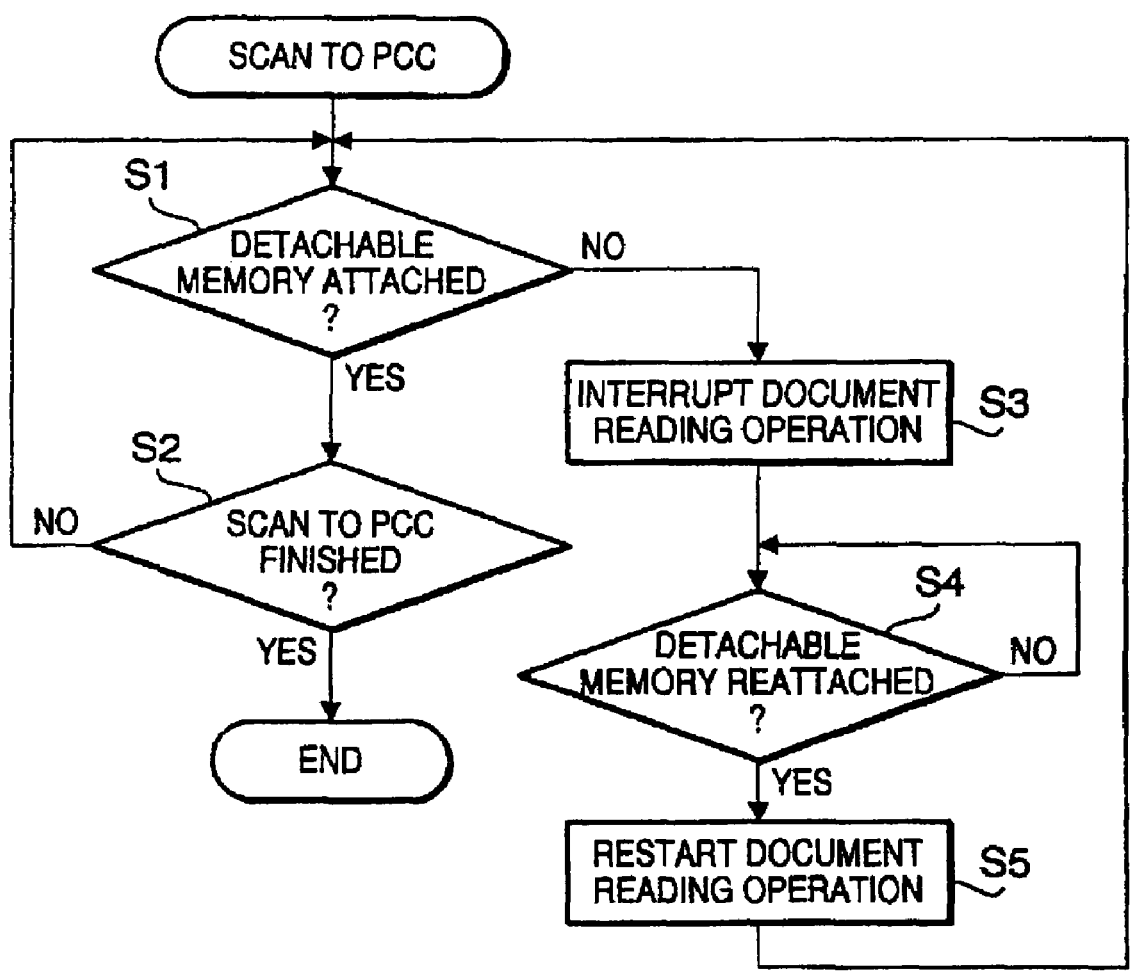
FIG. 3 is a flowchart showing an example of the framework of the operation of the multifunctional peripheral device, in which the device is controlled to interrupt document reading operation if an external memory is removed from a slot during image data storing.

FIG. 3 is a flowchart showing an example of a process which enables the restoring of the image data. Incidentally, the expressions "detachable memory" in the flowcharts of FIGS. 3 through 8 denote the external memory. The following explanation will be given assuming that the external memory (which stores the image data and which is removed by the user) is the first external memory 18, for the sake of simplicity of the explanation. The similar process can apply when the second or third external memory 19 or 20 is used.

In this example, the multifunctional peripheral device is controlled so as to interrupt the document reading operation (reading the document and generating the image data) if the first external memory 18 is removed after the start of the "Scan to PCC" process. When the "Scan to PCC" process is started, an image reading procedure (shown in FIG. 9) is started, and the CPU 2 judges whether the first external memory 18 is attached to the first slot 11 (S1). If the first external memory 18 is attached to the first slot 11 (S1: YES), a document reading operation is started (see FIG. 9) is started. It should be noted that, if the document reading operation has been started, no operation is performed in S11, and the document reading operation is continued and storing the image data into the first external memory 18 is carried out without change. The document reading and image data storing (which are performed in the document reading procedure shown in FIG. 9) are continued along with repeating the check of the step S1 (whether the first external memory 18 is attached to the first slot 11) until the whole image data storing is completed, by which the whole image data. of the document is stored in the first external memory 18 (S2).

Meanwhile, if the first external memory 18 is removed from the first slot 11 (S1: NO), the document reading operation is interrupted (S3). In this case, the image data storing with respect to the first external memory 18 is also interrupted since the first external memory has been removed. However, it is possible for the multifunctional peripheral device (executing the image data storing) to identify to which degree the image data storing has progressed. The image data storing to the first external memory 18 is carried out in units of prescribed blocks, therefore, the multifunctional peripheral device can judge that the image data storing has been completed securely to a block prior to a block that was being written when the first external memory 18 was removed from the first slot 11. Even if a block could not been written to its end, the multifunctional peripheral device has only to handle the block as a block that has not been stored in the first external memory 18 yet. Out of the image data read by the reading unit 6, image data corresponding to the blocks that have not been stored in the first external memory 18 is reserved. for example in RAM 4, without deleting.

The document reading operation is described in detail. FIG. 9 shows the document reading operation in which the image data is written in the first external memory 18 on a block basis as described above when the external memory 18 is coupled to the multifunctional peripheral device, and if the external memory 18 is detached, the data which has not yet written in the external memory 18 is reserved in the RAM 4, as described above.

In S91, a document is read (scanned) by a predetermined amount with use of the reading unit 6 to obtain image data representing the read portion of the document. The image data is temporarily stored in the RAM 4 (S92), and then the image data is processed so as to be suitable to be stored in the external memory 18 (S93). In S94, the Image data stored in the RAM 6 is transferred to the external storage block by block, wherein the block represent a predetermined unit amount of image data. It should be noted that the document reading operation is executed substantially in parallel with the SCAN to PCC operation. During the SCAN to PCC operation, if it is detected that the external memory 18 is detached (S1 of FIG. 3: NO) or the SCAN to PCC operation is completed (S2 of FIG. 3: YES), It is judged in S95 that the reading operation it to be interrupted or terminated (S95: YES), otherwise, control returns to S91. In S96, if the document reading operation is interrupted as the external storage 18 is detached, a procedure for retaining the image data temporarily stored in the RAM 4 is executed, and then the operation shown in FIG. 9 is terminated. If the external storage 18 is coupled and the SCAN to PCC is to be terminated, control proceeds from S95 to S96 and the data remained in the RAM 4 and is to be transferred to the external memory 18 is transferred (S96), and the document reading operation is terminated.

After the document reading operation is interrupted (S3), the interruption is continued until the first external memory 18 is attached to the first slot 11 (S4). When the first external memory 18 is attached to the first slot 11 (S4: YES), the document reading operation shown in FIG. 9 is restarted (S5). After the restart of the document reading operation, processes according to the "Scan to PCC" is continued (S1, S2). In this case, the image data that was reserved when the first external memory 18 was removed is written in the first external memory 18, following the already-stored blocks (blocks that had already been stored at the-point of the removal). Thereafter, image data that is generated after the restart of the document reading operation is successively written in the first external memory 18.

When the remainder of the image data is added to the already-stored image data, the storage location becomes significant. If the storage location in the data addition is improper, the original document can not be reproduced from the stored data. By the above control, the image data of the document generated by the reading system can be stored in the external memory securely and correctly maintaining its perfect form.

The above flowchart of FIG. 3 shows the framework (basic flow) of the operation of the multifunctional peripheral device in the case where the device is controlled to interrupt the document reading operation if the external memory is removed from the slot.

Figure 4:
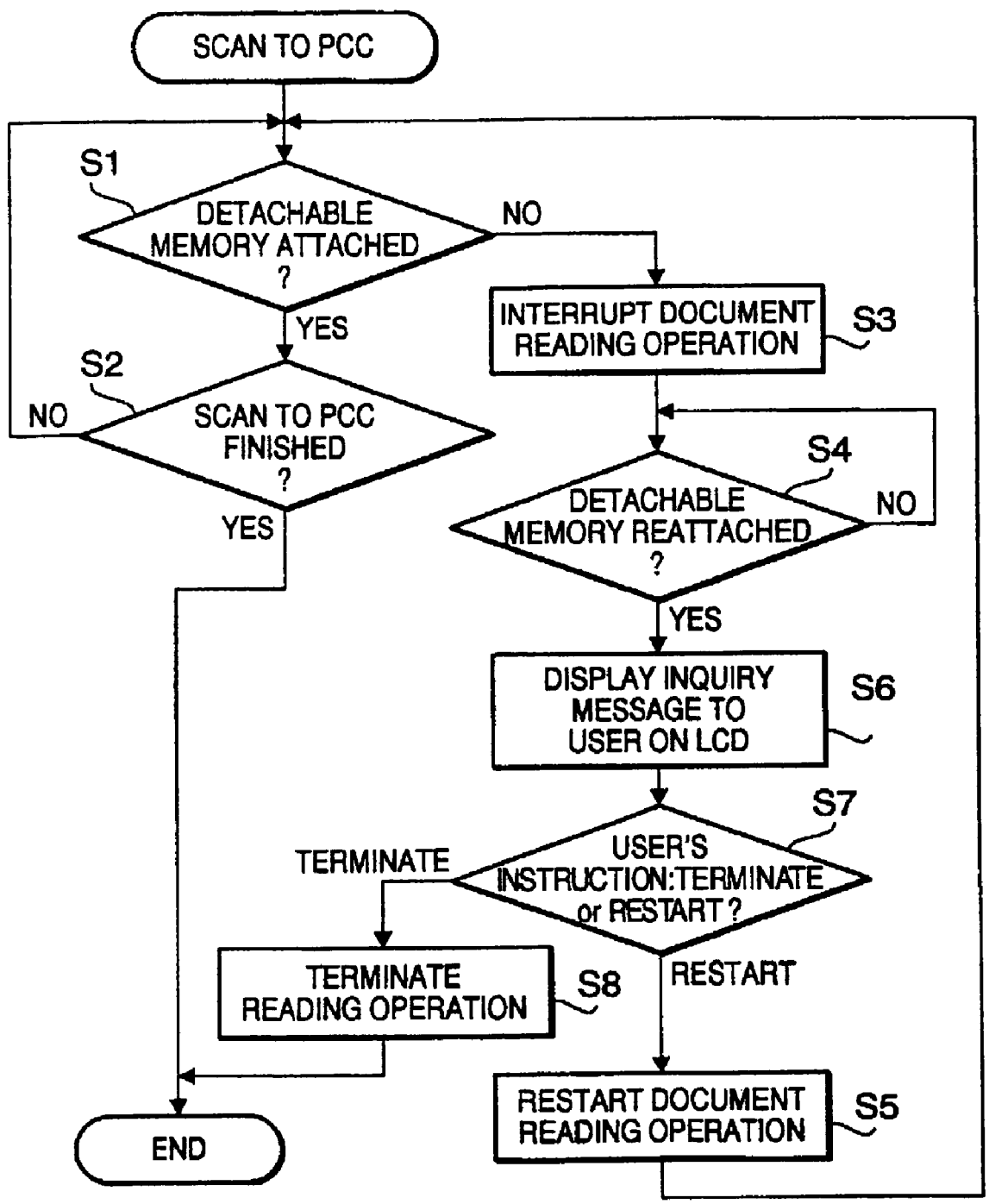
FIG. 4 is a flowchart showing a concrete example of the operation of the multifunctional peripheral device according to the framework of FIG. 3, designed to further improve the usability of the device.

FIG. 4 is a flowchart showing an improved example of the operation of the multifunctional peripheral device according to the framework of FIG. 3, designed to improve the usability of the device. In FIGS. 3-8, the steps for the similar procedures are assigned with the same step numbers, respectively.

Also in this example, when the "Scan to PCC" process is started, whether the first external memory 18 has been attached to the first slot 11 or not is checked (S1). If the first external memory 18 has been attached to the first slot 11 (S1: YES), the image data storing to the first external memory 18 is successively carried out block by block, by which the whole image data of the document is stored in the first external memory 18 (S2). Similarly to the above example, the check in step S1 (whether the first external memory 18 is attached to the first slot 11) is repeated until the whole image data storing is completed.

Meanwhile, if the first external memory 18 is removed from the first slot 11 (S1: NO), the document reading operation is interrupted (S3). Thereafter, the interruption is continued until the first external memory 18 is attached to the first slot 11 (S4).

When the first external memory 18 is attached to the first slot 11 after the interruption (S4: YES), a message inquiring of the user whether or not to restart the document reading operation is displayed on the LCD panel 8 (S6). The user who saw the message determines whether or not to restart the document reading operation, and inputs an instruction regarding subsequent process from the keyboard 9 (S7).

If the user selects the restart of the document reading operation and makes a corresponding key Input from the keyboard 9 (S7), the multifunctional peripheral device continues the "Scan to PCC" process and thereby remaining image data is stored in the first external memory 18 (S5). If the user selects the interruption of the document reading operation and makes a corresponding key input from the keyboard 9 (S7), the "Scan to PCC" process is ended (S8).

The user can not actually see information stored in the external memory 18 and judge whether the same external memory was reattached or not. Therefore, it is desirable that the user be informed of whether the same external memory is attached. Meanwhile, the user might have intentionally removed the external memory 18 from the slot In order to cancel the image data storing operation. In accordance with the configuration described above, the inquiry can be made when it is really necessary (omitting the inquiry when a different external memory was reattached) along with letting the user know the result of the judgment, and the image data storing to the external memory can be restarted or ended depending on the instruction by the user.

Figure 5:
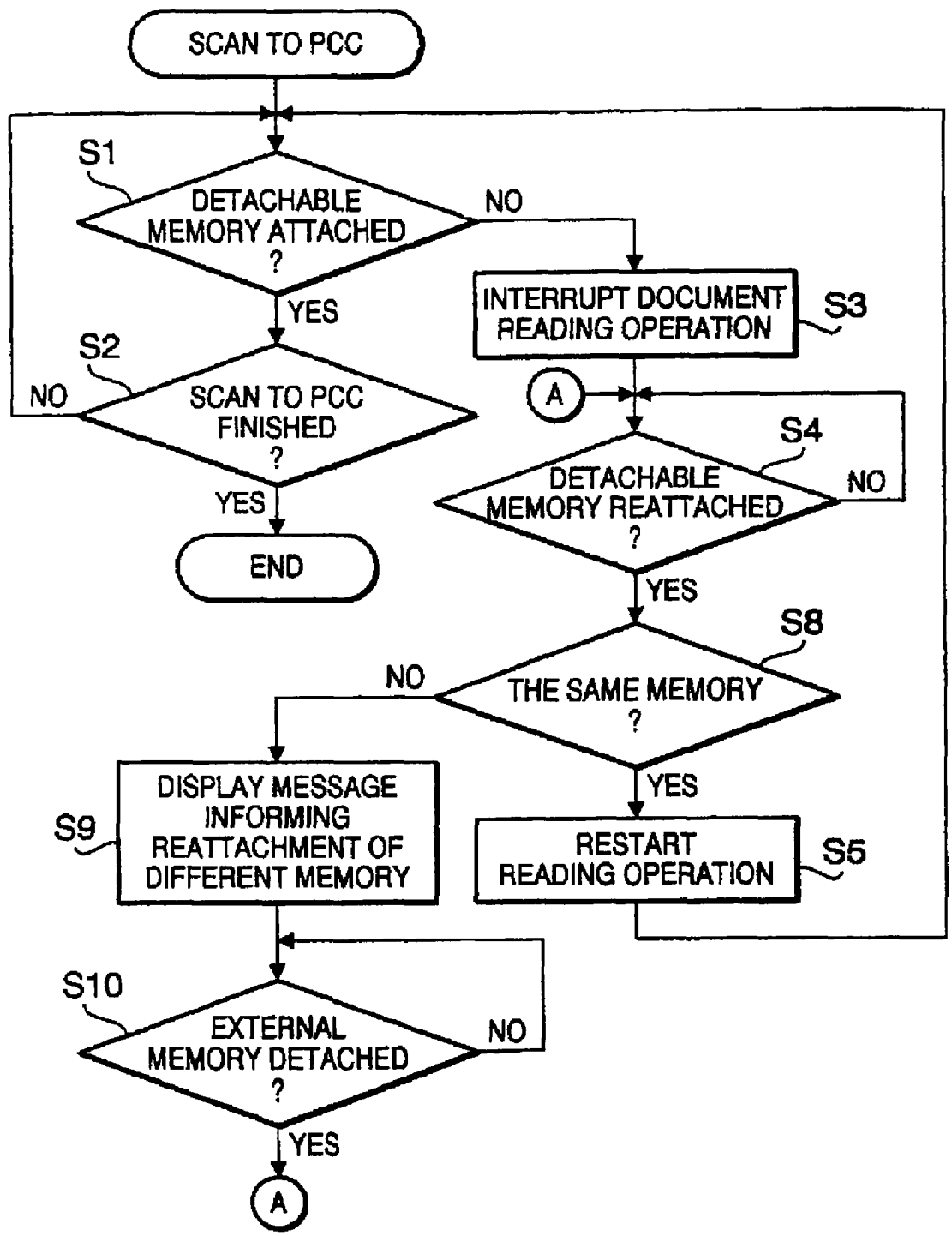
FIG. 5 is a flowchart showing another concrete example of the operation of the multifunctional peripheral device according to the framework of FIG. 3.

FIG. 5 is a flowchart showing another concrete example of the operation of the multifunctional peripheral device, which is an improved procedure of the framework of FIG. 3. In the example of FIG. 5, after the first external memory 18 is removed from the first slot 11 in the midst of the "Scan to PCC" process and an external memory is reattached to the first slot 11, the multifunctional peripheral device judges whether or not the reattached external memory is the first external memory 18 that was removed from the first slot 11 at the point when the image data storing was interrupted.

In the "Scan to PCC" process shown in FIG. 5, the check in step S1 (whether the first external memory 18 is attached to the first slot 11) is carried out similarly to the above examples. If the first external memory 18 is attached to the first slot. 11 (S1: YES), subsequent processes are conducted similarly to the examples of FIGS. 3 and 4 (S1, S2).

If the removal of the first external memory 18 is detected during the "Scan to PCC" process, subsequent processes are carried out as follows. When the first external memory 18 is removed from the first slot 11 (S1: NO), the document reading operation by the reading unit 6 is interrupted (S3). A waiting state caused by the interruption is continued until an external memory is reattached to the first slot 11 (S4). When an external memory is reattached to the first slot 11 during the waiting state (S4: YES), it is judged whether the same external memory was reattached (whether or not the reattached external memory is the first external memory 18 identical to one that was removed from the first slot 11 when the image data storing was interrupted) (S8).

If the same external memory was reattached (S8: YES), the document reading operation is restarted (S5) and the "Scan to PCC" process is continued. If the reattached external memory is different from the original first external memory 18 (S8: NO). a message informing the user of the fact that reattachment of a different external memory is displayed on the LCD panel 8 (S9). The user seeing the message notices that the external memory reattached to the first slot 11 is not the originally attached one.

If a different external memory has been reattached, the message remains on the LCD panel 8 until the external memory is removed (S10: NO). If the attached external memory is removed (S10: YES), the waiting state is continued until a next external memory is attached to the first slot 11 (S4). As described above, in the example of FIG. 5, the image data storing (writing of the remainder of the image data) after the interruption due to the removal of the first external memory 18 is executed only when the original first external memory 18 (which was removed from the first slot 11 when the image data storing was interrupted) is reattached.

The judgment on whether the reattached external memory is the original first external memory 18 (which was removed from the first slot 11 when the image data storing was interrupted) or not is made based on information stored in the reattached external memory. when the CPU 2 detects the reattachment of the external memory to the first slot 11, the CPU 2 controls the multifunctional peripheral device to retrieve internal information of the reattached external memory. The image data that had already been stored before the interruption has to be found in the reattached external memory if it is the original first external memory 18, and otherwise, the image data does not exist in the reattached external memory. The judgment in step S8 regarding the identity of external memories can easily be made based on such information. It should be noted that the invention need not be limited to such a configuration, and any alternative method to identify the external memory can be used. For example, predetermined ID intrinsic to each external memory may be assigned to or stored in the external memory 18.

If a set of image data is stored not in one external memory but in two external memories, data lacking the format as the image data is stored in each external memory, and the original contents of the document can not be reproduced from such defective data. Such troubles can be avoided without fail by the multifunctional peripheral device of FIG. 5.

Incidentally, while the "Scan to PCC" process is restarted immediately when the reattached external memory is judged in the step S8 to be the original first external memory 18 (that was removed from the first slot 11 at the point when the image data storing was interrupted) in the example of FIG. 5, it is also possible to add the steps S6 and S7 of FIG. 4 (inquiring of the user whether or not to restart the document reading operation) before the restart of the document reading operation (S5).

In the above examples of FIGS. 3 through 5, the document reading operation is interrupted if the removal of the first external memory 18 is detected in the midst of the "Scan to PCC" process, by which the multifunctional peripheral device avoids generating Image data that will not be stored in the first external memory 18. When the first external memory 18 is reattached to the first slot 11, the remaining part of the document is read by the reading unit 6 and corresponding image data is generated.

While examples, interrupting the document reading operation of the reading unit 6 on the removal of the first external memory 18 and thereby avoiding generating image data that will not be stored in the first external memory 18, have been described above, the present invention is not to be restricted to such examples.

FIGS. 6 through 8 show further examples of the operation of the multifunctional peripheral device (document reading device) In accordance with the present invention. In the examples shown in FIGS. 6 through 8, the multifunctional peripheral device is controlled to interrupt the image data storing operation to the first external memory 18 if the first external memory 18 is removed from the first slot 11 in the midst of the "Scan to PCC" process.

FIG. 6 is a flowchart showing the framework of such an example interrupting the image data storing operation. In the multifunctional peripheral device of FIG. 6, when the "Scan to PCC" process is started, whether the first external memory 18 has been attached to the first slot 11 or not is checked similarly to the examples of FIGS. 3 through 5 (S1). If it is judged that the first external memory 18 has been attached to the first slot 11 (S1: YES), subsequent processes are carried out similarly to the examples of FIGS. 3 through 5 (S1, S2).

Meanwhile, if the first external memory 18 is removed from the first slot 11 (S1: NO), only the image data storing operation to the first external memory 18 is interrupted (S20) in this example. In contrast, the document reading operation by the reading unit 6 is continued and obtained image data is successively stored in internal memory of the multifunctional peripheral device. It should be noted that the reading operation is not indicated in the flowchart shown in FIG. 6 for the sake of brevity. The waiting state is continued until the first external memory 18 is reattached to the first slot 11 (S4). When the first external memory 18 is reattached during the wait state (S4: YES), the image data storing operation to the first external memory 18 is restarted using the image data that has been stored in the internal memory (S21). When the image data storing operation to the first external memory 18 is restarted, processes of the "Scan to PCC" process following the document reading operation are restarted, by which the whole image data of the document is stored in the first external memory 18.

FIGS. 7 and 8 are flowcharts showing improved examples of the framework shown in FIG. 6.

In the example shown in FIG. 7, once the "Scan to PCC" process is started, the whole image data generated by the process is stored in the internal memory which is built in the main body of the multifunctional peripheral device. The image data storing operation to the first external memory 18 is carried out by transferring the image data from the internal memory to the first external memory 18. The process will be explained below.

After the "Scan to PCC" process is started, the whole image data of the document is temporarily stored in the internal memory (S30). Thereafter, if the first external memory 18 is judged to be attached to the first slot 11 (S1: YES), the image data temporarily stored in the internal memory is successively transferred to the first external memory 18 (S31). When the transfer of the whole image data from the internal memory to the first external memory 18 is completed (S2: YES), the "Scan to PCC" process is ended.

Meanwhile, if the first external memory 18 is removed from the first slot 11 in the midst of the image data transfer (S1: NO), the image data storing operation (image data transfer) to the first external memory 18 is interrupted(S20). The waiting state is continued until the first external memory 18 is reattached (S4). When the first external memory 18 is reattached (S4: YES), the image data storing operation to the first external memory 18 is restarted (S21). On the restart of the image data storing, the relationship between the storage location of the already-stored image data and that of added image data (i.e. image data appended to the already-stored image data) becomes significant. If the image data storing is carried out randomly regardless of the relationship, the stored data will lack the format as the image data of the original document. Therefore, the multifunctional peripheral device of this example searches for the endpoint of the already-stored image data in the first external memory 18 and stores the added image data starting at the endpoint of the already-stored image data (S31), by which perfect image data corresponding to the original document can be stored in the first external memory 18.

FIG. 8 is a flowchart showing another improved example of the operation of the multifunctional peripheral device according to the framework of FIG. 6.

In the multifunctional peripheral device of FIG. 8, the image data storing to the first external memory 18 is carried out by successively storing the image data in the internal memory built in the main body while repeating the image data transfer from the internal memory to the first external memory 18.

When the "Scan to PCC" process is started, whether the first external memory 18 has been attached to the first slot 11 or not is checked (S1). If the first external memory 18 has been attached to the first slot 11 (S1: YES), generated image data is successively stored in the internal memory (S40). Meanwhile, the image data stored in the internal memory is successively transferred to the first external memory 18 (S41). The above steps are repeated for the whole image data and thereby the whole image data of the document is stored in the first external memory 18 (S2).

If the first external memory 18 is removed from the first slot 11 (S1: NO), subsequent processes are carried out as follows. The successive image data storing to the internal memory is continued also in this case (S42). however, the image data transfer to the first external memory 18 is interrupted (S20)when the removal of the first external memory 18 is detected. Thereafter, the judgment on whether or not the first external memory 18 has been reattached to the first slot 11 is repeated until the first external memory 18 is reattached to the first slot 11 (S4) while successively storing and accumulating the generated image data in the internal memory. When the first external memory 18 is reattached to the first slot 11 (S4: YES). the image data storing operation (image data transfer) to the first external memory 18 is restarted and thereby the image data accumulated in the internal memory so far is transferred to the first external memory 18 (S21, S41). Thereafter, the steps S40 and S41 are repeated unless the removal of the first external memory 18 is detected, by which the whole image data of the document is stored in the first external memory 18 and the "Scan to PCC" process is ended (S2: YES).

Also in this example, the relationship between the storage location of the already-stored image data in the first external memory 18 and that of the added image data becomes significant. Therefore, the multifunctional peripheral device of this example also searches for the endpoint of the already-stored image data in the first external memory 18 and stores the added image data starting at the endpoint of the already-stored image data (S41), by which perfect image data corresponding to the original document is stored in the first external memory 18.

Incidentally, while the image data storing (or image data transfer) to the first external memory 18 is restarted (S21) immediately after the first external memory 18 is reattached to the first slot 11 in the flowcharts of FIGS. 6 through 8, some judgment steps maybe added before the restart. For example, it is possible to add the steps S6 and S7 of FIG. 4 in front of the step S21 and inquire of the user whether or not to restart the image data storing. If the user does not choose the restart. the "Scan to PCC" process is ended at that point.

Preferably, the judgment regarding the identity of the external memories (whether or not the external memory reattached to the first slot 11 is the first external memory 18 that was removed from the first slot 11 at the point when the image data storing was interrupted) like the steps S8 through S10 of FIG. 5 can also be added.

Also in the examples of FIGS. 6 through 8, it is possible to interrupt the document reading operation itself when the first external memory 18 is removed from the first slot 11.

While processes to be carried out when the first external memory 18 is removed from the first slot 11 have been explained above, there is a possibility that free space of the first external memory 18 runs out in the middle of the image data storing operation. In such cases, the "Scan to PCC" process may be ended. However, by temporarily storing the whole image data generated by the reading unit 6 in the internal memory, the image data storing operation to the first external memory 18 can be conducted later by use of the image data stored in the internal memory. While the above explanation has been given taking the first external memory 18 (and the first slot 11) as an example for the sake of simplicity of the explanation, the above processes can of course be applied to the second external memory 19, third external memory 20, etc.

The image data successfully stored in the external memories 18-20 can be used later, for example, by transmitting to other communication devices (such as a facsimile machine at a distant place) via the public network circuit.

As described above, in the document reading device and the document reading method in accordance with the embodiments, even if a detachable external memory is erroneously removed from the slot while the image data of the document read by the reading unit is being stored in the external memory, the image data storing operation to the external memory can be interrupted, and accordingly, occurrence of errors can be avoided. When the external memory is reattached to the slot after the removal, the image data storing operation can be restarted. In some embodiments, the image data storing operation is restarted based on the internal information of the reattached external memory. Accordingly, the remaining image data can be added to the already-stored image data, by which the whole image data corresponding to the document can be stored In the external memory without the need of conducting the document reading operation again from the beginning.

Although the present invention has been described with reference to the particular illustrative embodiments, the scope of the invention is derived from the appended claims, and should not be restricted by those embodiments. It is to be appreciated that those skilled in the art can change or modify the embodiments in various ways without departing from the scope and spirit of the present invention. For example, although the embodiments are directed to the document reading devices which san an image and stores the image data in the external memory, the invention need not be limited to the document reading devices. The present invention can be applied to any kind of device (e.g., a facsimile machine) which obtains (image) data and stores the same in the external memory coupled thereto.

The present disclosure relates to the subject matter contained in Japanese Patent Application No. 2002-097277, filed on Mar. 29, 2002, which is expressly incorporated herein by reference in its entirety.

What is claimed is:

1. A document reading device, comprising:
a reading system which reads a document and generates image data corresponding to an image formed on the document;
an attachment system to which an external memory is attached detachably;
a memory detection system which detects whether the external memory is attached to the attachment system;
a storing system which stores the image data generated by the reading system in the external memory; and
a control system which controls the operation of the reading system and the storing system based on information that is supplied from the memory detection system,
wherein the control system interrupts the image data storing to the external memory by the storing system if the memory detection system detects removal of the external memory from the attachment system after the reading system starts the document reading,
wherein the control system controls the storing system to carry out a predetermined operation based on information stored in the external memory if the memory detection system detected reattachment of the external memory to the attachment system, and wherein the control system controls the reading system to interrupt the document reading and the image data generation when the image data storing by the storing system is interrupted.

2. The document reading device according to claim 1, further comprising:

an inquiry system which inquires of the user whether or not to restart the image data storing; and an input system which lets the user input an instruction on whether or not to restart the image data storing, wherein the control system controls the storing system based on the instruction supplied from the input system.

3. The document reading device according to claim 1 wherein the control system includes a judgment system which judges whether or not the external memory reattached to the attachment system is the same as the external memory that was removed from the attachment system at the point when the storing system interrupted the image data storing.

4. The document reading device according to claim 3, wherein, if the judgment system judges that the reattached external memory is the same as the external memory that was removed from the attachment system when the storing system interrupted the image data storing, the control system controls the storing system to restart the image data storing and store the remainder of the image data in the reattached external memory starting at the endpoint of the image data that had already been stored in the external memory at the point when the image data storing was interrupted.

5. The document reading device according to claim 4, further comprising:

an inquiry system which inquires of the user whether or not to restart the image data storing if the judgment system judges that the reattached external memory is the same as the external memory that was removed from the attachment system when the storing system interrupted the image data storing; and an input system which lets the user input an instruction on whether or not to restart the image data storing, wherein the control system controls the storing system based on the instruction supplied from the input system.

6. The document reading device according to claim 3, wherein when the judgment system judges that the reattached external memory is different from the external memory that was removed from the attachment system at the point when the storing system interrupted the image data storing, the control system controls the reading system to stop the document reading and the image data generation.

7. The document reading device according to claim 3, further comprising:

an informing system which provides information to the user based on the judgment by the judgment system, and wherein when the judgment system judges that the reattached external memory is different from the external memory that was removed from the attachment system at the point when the storing system interrupted the image data storing, the control system controls the informing system to inform the user of the reattachment of the different external memory or the occurrence of a corresponding error.

8. The document reading device according to claim 1, wherein the control system controls the reading system to restart the document reading and the image data storing to the external memory if the memory detection system detects reattachment of the external memory to the attachment system.

9. The document reading device according to claim 1, further comprising:

an internal memory in addition to the external memory, wherein the control system lets the internal memory temporarily store the image data generated by the reading system and controls the storing system to carry out the image data storing to the external memory by transferring the image data from the internal memory to the external memory.

10. The document reading device according to claim 9, wherein the control system lets the internal memory store the whole image data of the document and thereafter controls the storing system to transfer the image data from the internal memory to the external memory, and wherein the control system controls the storing system to interrupt the image data transfer from the internal memory to the external memory if the removal of the external memory from the attachment system is detected by the memory detection system during the image data transfer from the internal memory to the external memory.

11. The document reading device according to claim 9, wherein the control system lets the internal memory successively store the image data of the document while controlling the storing system to successively transfer the image data from the internal memory to the external memory, and wherein, after the removal of the external memory from the attachment system is detected by the memory detection system the control system lets the internal memory continue the image data storing, while controlling the storing system to interrupt the image data transfer from the internal memory to the external memory.

12. The document reading device according to claim 9, wherein the control system includes a judgment system which judges whether or not the external memory reattached to the attachment system is the same as the external memory that was removed from the attachment system at the point when the storing system interrupted the image data storing.

13. The document reading device according to claim 12, wherein if the judgment system judges that the reattached external memory is the same as the external memory that was removed from the attachment system when the storing system interrupted the image data storing, the control system controls the storing system to restart the image data storing and store the remainder of the image data in the reattached external memory starting at the endpoint of the image data that had already been stored in the external memory at the point when the image data storing was interrupted.

14. The document reading device according to claim 13, further comprising:

an inquiry system which inquires of the user whether or not to restart the image data storing if the judgment system judged that the reattached external memory is the same as the external memory that was removed from the attachment system at the point when the storing system interrupted the image data storing; and an input system which lets the user input an instruction on whether or not to restart the image data storing, wherein the control system controls the storing system based on the instruction supplied from the input system.

15. The document reading device according to claim 12, wherein, when the judgment system judges that the reattached external memory is different from the external memory that was removed from the attachment system at the point when the storing system interrupted the image data storing, the control system controls the reading system to stop the document reading and the image data generation.

16. The document reading device according to claim 12, further comprising:
an informing system which provides information to the user based on the judgment by the judgment system,
wherein, when the judgment system judges that the reattached external memory is different from the external memory that was removed from the attachment system when the storing system interrupted the image data storing, the control system controls the informing system to inform the user of the reattachment of the different external memory or the occurrence of a corresponding error.

17. A document reading device, comprising:
a reading system which reads a document and generates image data corresponding to an image formed on the document:
an attachment system to which an external memory is attached detachably;
an internal memory in addition to the external memory;
a memory detection system which detects whether the external memory is attached to the attachment system;
a storing system which stores the image data generated by the reading system in the external memory;
a control system which controls the operation of the reading system and the storing system based on information that is supplied from the memory detection system;
an inquiry system which inquires of the user whether or not to restart the image data storing; and
an input system which lets the user input an instruction on whether or not to restart the image data storing,
wherein the control system interrupts the image data storing to the external memory by the storing system if the memory detection system detects removal of the external memory from the attachment system after the reading system starts the document reading,
wherein the control system controls the storing system to carry out a predetermined operation based on information stored in the external memory if the memory detection system detected reattachment of the external memory to the attachment system,
wherein the control system lets the internal memory temporarily store the image data generated by the reading system and controls the storing system to carry out the image data storing to the external memory by transferring the image data from the internal memory to the external memory, and
wherein the control system controls the storing system based on the instruction supplied from the input system.

18. A document reading device, comprising:
a reading system which reads a document and generates image data corresponding to an image formed on the document;
an attachment system to which an external memory is attached detachably;
an internal memory in addition to the external memory;
a memory detection system which detects whether the external memory is attached to the attachment system;
a storing system which stores the image data generated by the reading system in the external memory; and
a control system which controls the operation of the reading system and the storing system based on information that is supplied from the memory detection system,
wherein the control system interrupts the image data storing to the external memory by the storing system if the memory detection system detects removal of the external memory from the attachment system after the reading system starts the document reading,
wherein the control system controls the storing system to carry out a predetermined operation based on information stored in the external memory if the memory detection system detected reattachment of the external memory to the attachment system,
wherein the control system lets the internal memory temporarily store the image data generated by the reading system and controls the storing system to carry out the image data storing to the external memory by transferring the image data from the internal memory to the external memory,
wherein the control system lets the internal memory successively store the image data of the document while controlling the storing system to successively transfer the image data from the internal memory to the external memory, and
wherein, after the removal of the external memory from the attachment system is detected by the memory detection system, the control system lets the internal memory continue the image data storing, while controlling the storing system to interrupt the image data transfer from the internal memory to the external memory.

19. A document reading method for reading a document and storing image data corresponding to an image formed on the document in an external memory that is detachably attached to a document reading device, comprising the steps of:
reading a document and generating image data corresponding to the image;
storing the image data generated by the reading system in the external memory;
detecting whether or not the external memory is attached to the slot;
interrupting the steps of reading and storing if removal of the external memory from the slot is detected after the document reading is started; and
restarting the document reading if the external memory is reattached to the document reading device.

20. A computer-readable record medium storing a program for the execution of a document reading method for reading a document and storing image data corresponding to an image formed on the document in an external memory that is detachably attached to a document reading device, wherein the document reading method comprises the steps of:
reading a document and generating image data corresponding to the image;
storing the image data generated by the reading system in the external memory;
detecting whether or not the external memory is attached to the slot;

interrupting the steps of reading and storing if removal of the external memory from the slot is detected after the document reading is started; and restarting the document reading if the external memory is reattached to the document reading device.

21. A document reading device, comprising:

a reading system which reads a document and generates image data corresponding to an image formed on the document;

an attachment system to which an external memory is attached detachably;

an internal memory in addition to the external memory;

a memory detection system which detects whether the external memory is attached to the attachment system;

a storing system which stores the image data generated by the reading system in the external memory; and a control system which controls the operation of the reading system and the storing system based on information that is supplied from the memory detection system, wherein the control system interrupts the image data storing to the external memory by the storing system if the memory detection system detects removal of the external memory from the attachment system after the reading system starts the document reading, wherein the control system controls the storing system to carry out a predetermined operation based on information stored in the external memory if the memory detection system detected reattachment of the external memory to the attachment system, wherein the control system lets the internal memory temporarily store the image data generated by the reading system and controls the storing system to carry out the image data storing to the external memory by transferring the image data from the internal memory to the external memory, wherein the control system lets the internal memory store the whole image data of the document and thereafter controls the storing system to transfer the image data from the internal memory to the external memory, and wherein the control system controls the storing system to interrupt the image data transfer from the internal memory to the external memory if the removal of the external memory from the attachment system is detected by the memory detection system during the image data transfer from the internal memory to the external memory.

* * * * *